July 6, 1954
R. J. BRANSON
2,682,752
SYSTEM FOR CONSERVING VAPORS
Filed Jan. 6, 1950
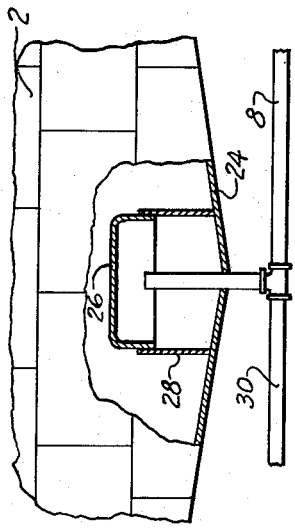
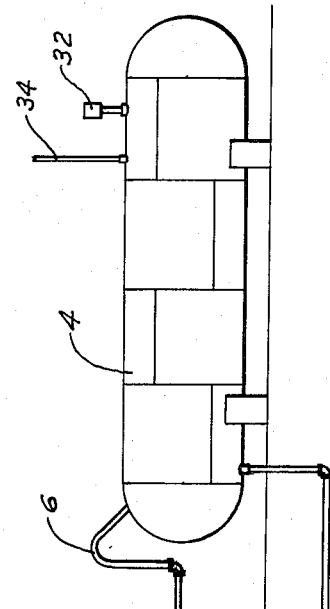
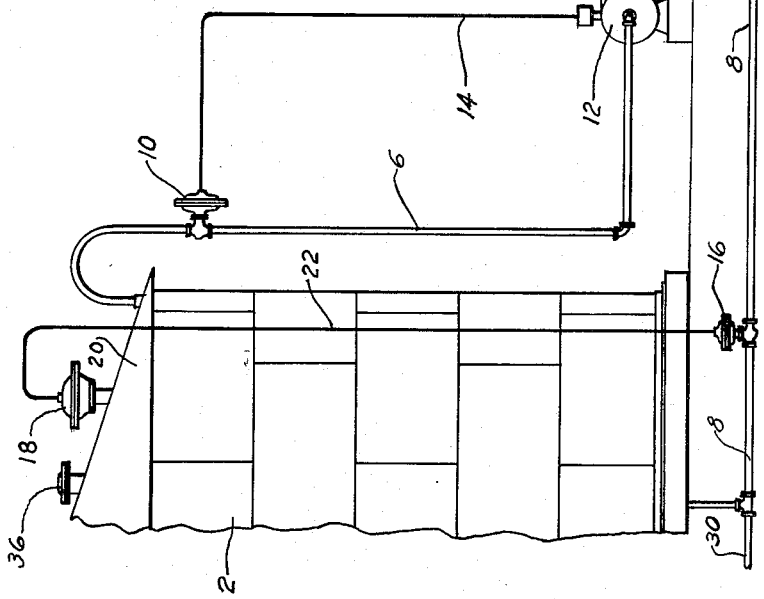
INVENTOR.
R. J. Branson
BY
C. M. McKnight

Patented July 6, 1954

2,682,752

UNITED STATES PATENT OFFICE 2,682,752

SYSTEM FOR CONSERVING VAPORS

Raymond J. Branson, Tulsa, Okla., assignor to McNamar Boiler & Tank Company, Inc., Tulsa, Okla., a corporation of Oklahoma Application January 6, 1950, Serial No. 137,212

4 Claims. (Cl. 62—1)

This invention relates to a system for conserving vapors, and more particularly, but not by way of limitation, to a system for conserving liquified petroleum gases and crude oil vapors and gravity.

In the storage of crude oil, some means must be provided to compensate for the pressure differential between the interior and exterior of the storage tanks caused by the expansion and contraction of the vapors in the tanks. A common practice is to provide a breather pipe in the top of the tanks which results in a large economical loss when the vapors expand and discharge through the pipe, and permits air to be drawn into the tank when the vapors contract, whereupon the moisture contained in the air condenses on the internal surfaces of the metal roofs and walls which materially increases the corrosion rate thereof. The loss of the vapors to the atmosphere, in addition to being a material economical loss in itself, causes an increase in the gravity of the remaining crude oil which reduces its value. Supplementing the loss of vapors from the crude oil storage tanks, is the loss of valuable vapors now being vented from oil treaters or the like.

The present invention contemplates a system for conserving liquified petroleum gases and crude oil vapors and gravity utilizing a battery of storage tanks, a high pressure gas tank, a vapor vent line from each of the storage tanks to the high pressure gas tank, a return line from the high pressure gas tank to each of the storage tanks, a compressor in each of the vapor vent lines and the necessary valves and electrical connections whereby expanding vapors are taken off of the top of the storage tanks, partially liquified by compression and natural refrigeration, stored in the high pressure gas tank and returned to the lower portion of the storage tanks when the pressure is reduced therein to conserve the vapors and enhance the gravity of the parent liquid by causing the recovered vapors to circulate therethrough.

An important object of this invention is to provide a system for conserving vapors and gravity of crude oil which will operate automatically, be relatively simple in operation, and economical.

Another object of this invention is to provide a system for conserving vapors of crude oil which would otherwise be lost to the atmosphere and gravity of crude oil which would otherwise be increased by the loss of the lighter hydrocarbons.

Another object of this invention is to provide a system for conserving vapors and gravity of crude oil which will permit storage tanks to be made of lighter materials than is conventionally used.

Another object of this invention is to provide a system for the conservation of vapors and gravity of crude oil which will prevent the roofs and walls of storage tanks from collapsing or bursting that may be caused by varying internal pressures.

Another object of this invention is to provide a system for the conservation of vapors and gravity of crude oil which will reduce corrosion of the inner surfaces of the metal roofs and walls of storage tanks.

Another object of this invention is to provide a system for the conservation of vapors and gravity of crude oil which may be adapted to accommodate a battery of storage tanks and one or more oil treaters or the like.

A further object of this invention is to provide a system for the conservation of liquified petroleum gases presently wasted in order that they may be carried over to the winter months when there is a market for them.

Other objects and advantages of the invention will be evident from the following detailed description, read in conjunction with the accompanying drawings, which illustrate my invention.

In the drawings:

Fig. 1 is a side elevation showing the general arrangement of the apparatus utilized in the system.

Fig. 2 is a side elevation partially in section showing the connections at the bottom of a storage tank.

Referring to the drawings in detail, an oil storage tank 2 is connected to a high pressure gas tank 4 by a vapor vent line 6 and a return line 8. Interposed in the vapor vent line 6 is a diaphragm control switch 10, and a vapor compressor 12 having any suitable prime mover and starter electrically connected to diaphragm control switch 10 by suitable wires 14. Interposed in return line 8 is a pressure operated valve 16 electrically connected to a diaphragm control switch 18 disposed on the roof 20 of storage tank 2 by suitable wires 22. Return line 8 enters storage tank 2 at the vertex (Fig. 2) of the conically shaped bottom 24, above which is disposed a bubble distribution cap 26 supported by spacer bars 28. A conduit 30, communicating with a gas gathering system for oil treaters or the like (not shown), is interconnected to return line 8 between storage tank 2 and pressure operated valve 16. The high pressure gas tank 4 is provided with a pressure relief valve 32 open to the atmosphere and a conduit 34 communicating with a fuel gas system (not shown). Any suitable type of combination pressure relief and vacuum relief valve 36 is disposed on roof 20 of storage tank 2.

As a modification of the system illustrated by the drawings, storage tank 2 may be a pressure type tank such as normally used for liquified petroleum gases, i. e., a tank having a concave roof, or concave end such as in a horizontal tank, furthermore the conduit 30 may communicate with a liquified petroleum gas gathering system in lieu of oil treaters.

Operation

Gases expanding above the liquid level in storage tank 2 will flow through vapor vent line 6 into communication with the diaphragm member of diaphragm control switch 10, thereby operating the switch and through electrical connection 14 start vapor compressor 12 to permit the withdrawal of gases through vapor vent line 6 to high pressure gas tank 4. The gases entering high pressure gas tank 4 will be partially liquified due to the high pressure obtained by vapor compressor 12, and the discharge of heat to the atmosphere through the walls of vapor vent line 6 and high pressure gas tank 4. The reduction of pressure in storage tank 2 to a predetermined pressure will reverse the diaphragm member in diaphragm control switch 10, thereby operating the switch and through electrical connection 14 stop vapor compressor 12.

A reduction of pressure in storage tank 2, which may be caused by a contraction of the gases above the liquid level, or a withdrawal of liquid from the tank, will actuate the diaphragm control switch 18, thereby operating the switch and through electrical connection 22 open pressure operated valve 16 to permit partially liquified vapors to return to storage tank 2 from the bottom of high pressure gas tank 4 through return line 8. The partially liquified vapors entering storage tank 2 through the conically shaped bottom 24 and bubble distribution cap 26 are thoroughly mixed with the parent liquid in tank 2, thereby maintaining its gravity. In addition, the heavy ends of the parent liquid in storage tank 2 tend to flow toward the vertex of the conically shaped bottom 24, thereby encouraging the lighter liquids from high pressure gas tank 4 to mix with the heavier oils to maintain a more uniform product. When the pressure in storage tank 2 increases sufficiently, the diaphragm member of diaphragm control switch 18 reverses, thereby operating the switch and through electrical connection 22 closes pressure operated valve 16, whereupon the flow of partially liquified vapors from high pressure gas tank 4 to storage tank 2 ceases.

Gases which are normally vented to the atmosphere from oil treaters or the like may be accumulated in a suitable gathering system and enter storage tank 2 through conduit 30, return line 8 and bubble distribution cap 26 to thoroughly mix with the parent liquid and further enhance its gravity.

Dry gases are drawn off of the top of high pressure gas tank 4 and are discharged to a fuel gas system through conduit 34.

The pressure relief valve 32, which discharges to the atmosphere, relieves the pressure in high pressure gas tank 4 when excessive pressures are created wherein.

Pressure relief and vacuum relief valve 36 on roof 20 of storage tank 2 relieves excessive pressures in the tank in the event diaphragm control switch 10 or vapor compressor 12 fail to operate, and admits air to relieve a vacuum which may be created in the tank in the event diaphragm control switch 18 or pressure operated valve 16 fail to work.

It is readily seen that the present invention compensates for the expansion or contraction of gases in a storage tank and for a vacuum created in the tank during unloading, thereby preventing the bursting or collapsing of the roof and walls due to these causes.

Air is prevented from entering the storage tank while the system is in operation, thereby reducing corrosion of the inner surfaces of the metal roof and walls due to moisture from the air precipitating thereon.

The internal pressure of the storage tank may be closely controlled by the diaphragm control switches, thereby permitting the tank to be made of lighter materials than is conventionally used. It is apparent that one high pressure gas tank may be utilized with a battery of storage tanks in a tank farm.

As a result of the natural refrigeration obtained by the discharge of heat through the walls of the vapor vent line and the high pressure gas tank when the system is adapted to one or more liquified petroleum gas storage tanks, the liquified petroleum gases may be stored at a lower pressure than is normally required, thereby permitting the storage tanks to be made of lighter materials which will reduce the cost of the tanks and make it economical to save the liquified petroleum gases, which are now usually wasted through the summer months, for sale during the winter months.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In a fluid gathering system for a storage tank containing liquefied petroleum gas and communicating with a high pressure fluid tank and containing the same gases, a compressor interposed between and communicating with the storage tank and the high pressure tank, control means operatively associated with the storage tank and the compressor, said control means being responsive to variances in internal pressure of the storage tank to provide alternate operation and non-operation of the compressor to intermittently discharge gases from the storage tank and then liquefy them to be discharged to the high pressure tank, a return conduit communicating between the high pressure tank and the bottom of the storage tank, a return control valve interposed in the return conduit, a second control means operatively associated with the storage tank and the return control valve and responsive to variances of internal pressure within the storage tank to provide actuation of the return control valve and discharge of fluid from the high pressure tank to the storage tank.

2. A system for conserving vapors of liquefied gases produced by a volatile fluid in a storage tank containing petroleum products, a high pressure tank, a conduit interconnecting the high pressure tank to the upper portion of the storage tank, means interposed in the conduit to remove vapors from the storage tank and compress the vapors to liquefication conditions, means for controlling the operation of said first mentioned means in accordance with the pressure in the storage tank, a second conduit interconnecting the high pressure tank to the storage tank to return the liquefied vapors to the storage tank and enhance the gravity of the volatile fluid, and a second control means for controlling the return flow to the storage tank in accordance with the pressure in the storage tank.

3. A system for conserving vapors of liquefied gases produced by a volatile fluid in a storage tank containing petroleum products, a high pressure tank, a conduit interconnecting the high pressure tank to the upper portion of the storage tank, means interposed in the conduit to remove vapors from the storage tank and compress the vapors to liquefication conditions, means for controlling the operation of said first mentioned means in accordance with the pressure in the storage tank, a second conduit interconnecting the high pressure tank to the lower portion of the storage tank to return the liquefied vapors to the storage tank and flow the liquefied vapors through the volatile fluid remaining in the storage tank, and a second control means for controlling the return flow to the storage tank in accordance with the pressure in the storage tank.

4. A system for conserving liquefied petroleum gas vapors produced by change of pressure in a storage tank, comprising a high pressure tank, a conduit interconnecting the high pressure tank to the upper portion of the storage tank, a compressor interposed in the conduit for removing expanding vapors from the storage tank and compressing the vapors to liquid, a diaphragm switch responsive to pressure change in the storage tank for controlling the operation of the compressor means, a second conduit interconnecting the high pressure tank to the bottom of the storage tank for returning the liquefied vapors to the storage tank and enhancing the gravity of the liquefied petroleum gases therein, a second diaphragm control switch responsive to a reduction in pressure in the storage tank to control the return flow of the liquefied vapors from the high pressure tank to the storage tank.

References Cited in the file of this patent

UNITED STATES PATENTS

| Number | Name | Date |
|---|---|---|
| 1,596,798 | Hansen et al. | June 1, 1926 |
| 1,901,576 | Atwell | Mar. 14, 1933 |
| 2,059,942 | Gibson | Nov. 3, 1936 |
| 2,096,255 | McIlrath | Oct. 19, 1937 |
| 2,387,894 | Fannin | Oct. 30, 1945 |
| 2,550,886 | Thompson | May 1, 1951 |